(12) United States Patent
Suzuki et al.

(10) Patent No.: US 9,512,795 B2
(45) Date of Patent: Dec. 6, 2016

(54) INTER-CYLINDER AIR-FUEL RATIO VARIATION ABNORMALITY DETECTION APPARATUS

(71) Applicant: Toyota Jidosha Kabushiki Kaisha, Toyota-shi Aichi-ken (JP)

(72) Inventors: Kenji Suzuki, Susono (JP); Yasushi Iwazaki, Ebina (JP); Hiroshi Miyamoto, Shizuoka-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 293 days.

(21) Appl. No.: 14/510,703

(22) Filed: Oct. 9, 2014

(65) Prior Publication Data

US 2015/0107346 A1    Apr. 23, 2015

(30) Foreign Application Priority Data

Oct. 17, 2013    (JP) .................................. 2013-216396

(51) Int. Cl.
*G01M 15/10* (2006.01)
*F02D 41/00* (2006.01)
*F02D 41/14* (2006.01)

(52) U.S. Cl.
CPC ......... *F02D 41/009* (2013.01); *F02D 41/0085* (2013.01); *F02D 41/1456* (2013.01); *G01M 15/104* (2013.01)

(58) Field of Classification Search
CPC .......... F02D 41/0085; F02D 41/1456; F02D 41/009; F02D 41/22; G01M 15/104
USPC ...................................... 73/114.72
See application file for complete search history.

(56) References Cited

U.S. PATENT DOCUMENTS 7,195,008 B2 *  3/2007  Annoura ............... F02D 41/008
                                                    123/674
7,801,666 B2 *  9/2010  Mitsuda ................. F02D 13/06
                                                    123/674
8,510,017 B2 *  8/2013  Sawada ............... F02D 41/0085
                                                    123/673
8,903,625 B2 * 12/2014  Kidokoro ........... F02D 41/0085
                                                    123/673
8,965,665 B2 *  2/2015  Iwazaki ................ F02D 41/008
                                                    123/672
9,194,315 B2 * 11/2015  Iwazaki ............. F02D 41/0085
9,194,316 B2 * 11/2015  Miyamoto .......... F02D 41/0085
9,328,685 B2 *  5/2016  Suzuki
9,435,279 B2 *  9/2016  Iwazaki ............. F02D 41/1454
2002/0088446 A1 * 7/2002  Wachi ................ F02D 41/1474
                                                    123/673

(Continued)

FOREIGN PATENT DOCUMENTS

JP      2002-201984 A    7/2002
JP       5024676 B2      9/2012

*Primary Examiner* — Freddie Kirkland, III
(74) *Attorney, Agent, or Firm* — Dinsmore & Shohl LLP

(57) ABSTRACT

An apparatus includes an air-fuel ratio sensor installed in an exhaust passage common to a plurality of cylinders in a multicylinder internal combustion engine, and a control apparatus configured to detect an inter-cylinder air-fuel ratio variation abnormality based on a parameter correlated with a degree of variation in output from the air-fuel ratio sensor. The control apparatus is configured to calculate a division crank angle that bisects an area of a region present in at least one of a rich and a lean sides with respect to a mean value of an output waveform from the air-fuel ratio sensor during one cycle of the internal combustion engine or such a predetermined constant value as corresponds to a center of fluctuation in the output waveform and to identify an abnormal cylinder with a deviation of the air-fuel ratio based on the division crank angle.

9 Claims, 11 Drawing Sheets

(56) References Cited

U.S. PATENT DOCUMENTS

| | | | | |
|---|---|---|---|---|
| 2014/0129116 A1* | 5/2014 | Suzuki | F02D 41/1498 | 701/103 |
| 2014/0283801 A1* | 9/2014 | Suzuki | F02D 41/1495 | 123/674 |
| 2014/0298889 A1* | 10/2014 | Miyamoto | G01M 15/104 | 73/23.32 |
| 2014/0309907 A1* | 10/2014 | Iwazaki | F02D 41/1454 | 701/103 |

\* cited by examiner

| FIG.10A |
|---|
| FIG.10B |

INTER-CYLINDER AIR-FUEL RATIO VARIATION ABNORMALITY DETECTION APPARATUS

CROSS-REFERENCES TO RELATED APPLICATIONS

This application claims the benefit of Japanese Patent Application No. 2013-216396, filed Oct. 17, 2013, which is hereby incorporated by reference herein in its entirety.

BACKGROUND OF THE INVENTION

Field of the Invention

The present invention relates to an inter-cylinder air-fuel ratio variation abnormality detection apparatus for a multicylinder internal combustion engine, and in particular, to an apparatus that detects abnormality (imbalance abnormality) in which some cylinders have an air-fuel ratio relatively significantly deviating from the air-fuel ratio of the remaining cylinders.

Description of the Related Art

In general, to efficiently remove harmful exhaust components for purification using a catalyst, an internal combustion engine with an exhaust purification system utilizing the catalyst needs to control the mixing ratio between air and fuel in an air-fuel mixture combusted in the internal combustion engine, that is, the air-fuel ratio. For such control of the air-fuel ratio, an air-fuel ratio sensor is provided in an exhaust passage in the internal combustion engine to perform feedback control to make the detected air-fuel ratio equal to a predetermined air-fuel ratio.

On the other hand, a multicylinder internal combustion engine normally controls the air-fuel ratio using identical controlled variables for all cylinders. Thus, even when the air-fuel ratio control is performed, the actual air-fuel ratio may vary among the cylinders. In this case, if the variation is at a low level, the variation can be absorbed by the air-fuel ratio feedback control, and the catalyst also serves to remove harmful exhaust components for purification. Consequently, such a low-level variation is prevented from affecting exhaust emissions and from posing an obvious problem.

However, if, for example, fuel injection systems for any cylinders become defective to significantly vary the air-fuel ratio among the cylinders, the exhaust emissions disadvantageously deteriorate. Such a significant variation in air-fuel ratio as deteriorates the exhaust emissions is desirably detected as abnormality. In particular, for automotive internal combustion engines, there has been a demand to detect variation abnormality in air-fuel ratio among the cylinders in a vehicle mounted state (on board) in order to prevent a vehicle with deteriorated exhaust emissions from travelling.

SUMMARY OF THE INVENTION

For detection of an inter-cylinder air-fuel ratio variation abnormality, a parameter correlated with the degree of a variation in the output from the air-fuel sensor may be calculated so that variation abnormality can be detected based on the calculated parameter.

Furthermore, it is desirable to allow identification of an abnormal cylinder that may cause a deviation of the air-fuel ratio and thus variation abnormality so that quick repairs can subsequently be achieved.

For the cylinder identification, for example, Japanese Patent Laid-Open No. 2002-201984 discloses that a rich- or lean-side peak phase of varying output from the air-fuel ratio sensor is detected so that one cylinder estimated to have a deviating output value from the air-fuel ratio sensor can be identified based on the peak phase. The amount of fuel for the identified cylinder is corrected to make the air-fuel ratio uniform among the cylinders.

However, the peak phase of the output from the air-fuel ratio sensor varies relatively significantly. Thus, the method of identifying the abnormal cylinder based on the peak phase has the disadvantage of identifying a wrong cylinder as the abnormal cylinder.

Thus, the present invention has been developed in view of the above-described circumstances. An object of the present invention is to provide an inter-cylinder air-fuel ratio variation abnormality detection apparatus that enables an increase in the accuracy with which the abnormal cylinder is identified.

An aspect of the present invention provides an inter-cylinder air-fuel ratio variation abnormality detection apparatus including:

an air-fuel ratio sensor installed in an exhaust passage common to a plurality of cylinders in a multicylinder internal combustion engine; and a control apparatus configured to calculate a parameter correlated with a degree of variation in output from the air-fuel ratio sensor and to detect an inter-cylinder air-fuel ratio variation abnormality based on the calculated parameter, wherein the control apparatus is configured to calculate a division crank angle that bisects an area of a region present in at least one of a rich and a lean sides with respect to a mean value of an output waveform from the air-fuel ratio sensor during one cycle of the internal combustion engine or such a predetermined constant value as corresponds to a center of fluctuation in the output waveform, the region being enclosed by an output waveform from the air-fuel ratio sensor and the mean value or the constant value, and to identify an abnormal cylinder with a deviation of the air-fuel ratio based on the division crank angle.

Preferably, the control apparatus identifies, as the abnormal cylinder, a source cylinder for exhaust gas detected by the air-fuel ratio sensor at a point in time of the division crank angle.

Preferably, the control apparatus calculates the division crank angle that bisects the area of the region present on the lean side with respect to the mean value or the constant value, and determines a source cylinder for exhaust gas detected by the air-fuel ratio sensor at a point in time of the division crank angle to identify the source cylinder as an abnormal cylinder with a lean-side deviation of the air-fuel ratio.

Preferably, the control apparatus calculates the division crank angle that bisects the area of the region present on the rich side with respect to the mean value or the constant value, and determines a source cylinder for exhaust gas detected by the air-fuel ratio sensor at a point in time of the division crank angle to identify the source cylinder as an abnormal cylinder with a rich-side deviation of the air-fuel ratio.

Preferably, the control apparatus is configured to calculate the division crank angle based on the mean value of the output waveform and to execute:

(A) a step of acquiring an output value from the air-fuel ratio sensor;

(B) a step of calculating the mean value based on the output value from the air-fuel ratio sensor;

(C) a step of calculating a difference between the output value from the air-fuel ratio sensor and the mean value;

(D) a step of integrating the difference while the output value from the air-fuel ratio sensor is present on one of the lean and rich sides with respect to the mean value, to calculate the area of the region; and (E) a step of calculating the division crank angle that bisects the area of the region.

Preferably, the control apparatus is configured to further execute:

(F) a step of determine the source cylinder for exhaust gas detected by the air-fuel ratio sensor at the point in time of the division crank angle to identify the source cylinder as an abnormal cylinder.

Preferably, the control apparatus, in the step (D), integrates the difference while the output value from the air-fuel ratio sensor is present on the lean side with respect to the mean value, and in the step (F), identifies the source cylinder as an abnormal cylinder with a lean-side deviation of the air-fuel ratio.

Preferably, the control apparatus, in the step (D), integrates the difference while the output value from the air-fuel ratio sensor is present on the rich side with respect to the mean value, and in the step (F), identifies the source cylinder as an abnormal cylinder with a rich-side deviation of the air-fuel ratio.

Preferably, the output waveform from the air-fuel ratio sensor is a periodic waveform with a period equal to one cycle of the internal combustion engine.

The present invention exerts an excellent effect of enabling an increase in the accuracy with which the abnormal cylinder is identified.

Further features of the present invention will become apparent from the following description of exemplary embodiments (with reference to the attached drawings).

DESCRIPTION OF THE EMBODIMENTS

An embodiment of the present invention will be described below with reference to the attached drawings.

Figure 1:
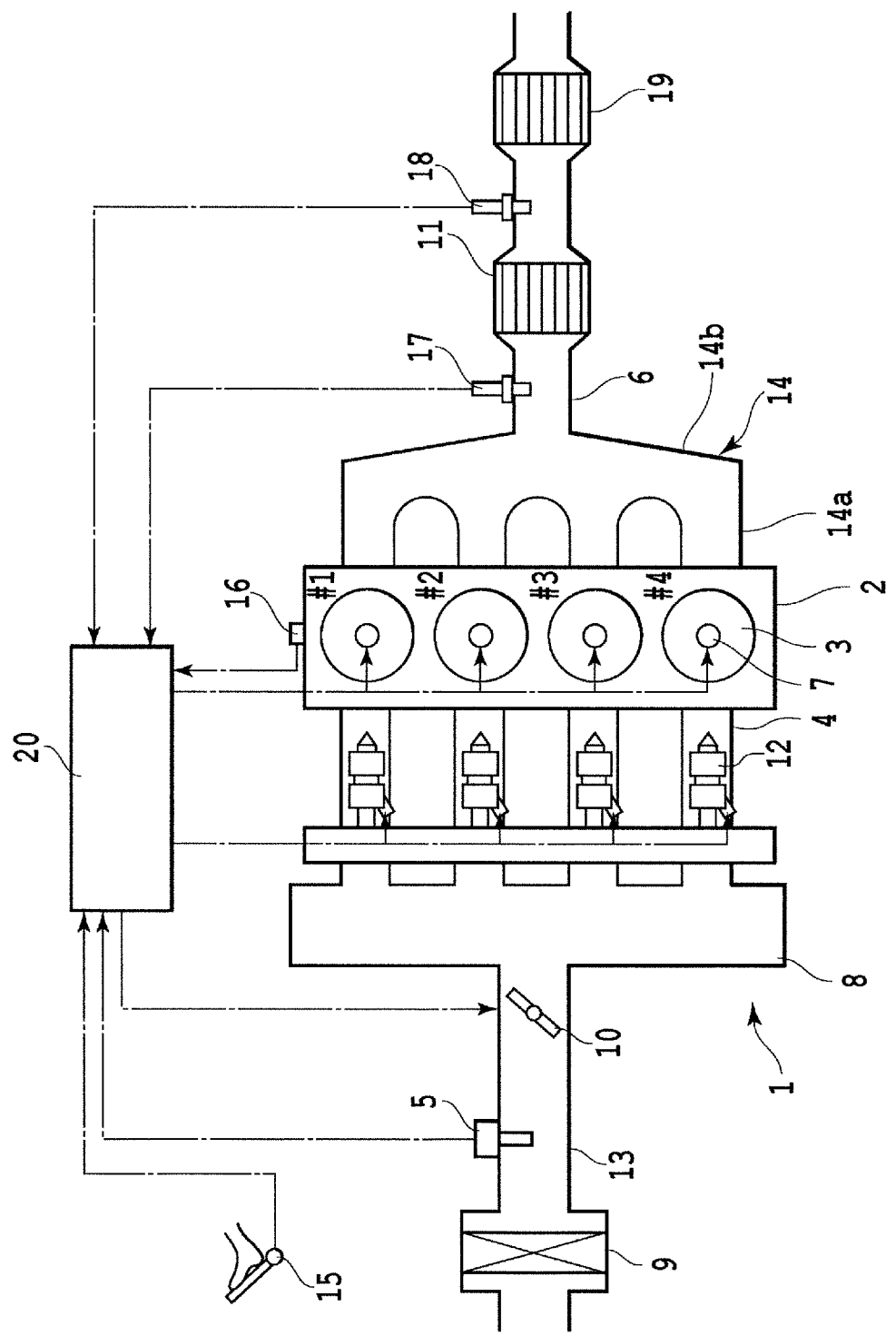
FIG. 1 is a schematic diagram of an internal combustion engine according to an embodiment of the present invention.

FIG. 1 is a schematic diagram of an internal combustion engine according to the present embodiment. An internal combustion engine (engine) 1 combusts a mixture of fuel and air inside a combustion chamber 3 formed in a cylinder block 2, and reciprocates a piston in the combustion chamber 3 to generate power. The internal combustion engine includes a plurality of cylinders, and according to the present embodiment, the internal combustion engine includes four cylinders #1 to #4. Furthermore, the internal combustion engine 1 according to the present embodiment is a multi-cylinder internal combustion engine mounted in a car, more specifically, an inline-four spark ignition internal combustion engine. The number, type, and the like of the cylinders in the internal combustion engine according to the present invention are not particularly limited. However, the number of cylinders is three or more.

Although not depicted in the drawings, a cylinder head of the internal combustion engine 1 includes intake valves each disposed at a corresponding cylinder to open and close a corresponding intake port and exhaust valves each disposed at a corresponding cylinder to open and close a corresponding exhaust port. Each intake valve and each exhaust valve are opened and closed by a cam shaft. The cylinder head includes ignition plugs 7 each attached to a top portion of the cylinder head for the corresponding cylinder to ignite the air-fuel mixture in the combustion chamber 3.

The intake port of each cylinder is connected, via a branch pipe 4 for the cylinder, to a surge tank 8 that is an intake air aggregation chamber. An intake pipe 13 is connected to an upstream side of the surge tank 8, and an air cleaner 9 is provided at an upstream end of the intake pipe 13. The intake pipe 13 incorporates an air flow meter 5 (intake air amount detection device) for detecting the amount of intake air and an electronically controlled throttle valve 10, the air flow meter 5 and the throttle valve 10 being arranged in order from the upstream side. The intake port, the branch pipe 4, the surge tank 8, and the intake pipe 13 form an intake passage.

Each cylinder includes an injector (fuel injection valve) 12 disposed therein to inject fuel into the intake passage, particularly the intake port. The fuel injected by the injector 12 is mixed with intake air to form an air-fuel mixture, which is then sucked into the combustion chamber 3 when the intake valve is opened. The air-fuel mixture is compressed by the piston and then ignited and combusted by the ignition plug 7. The injector may inject fuel directly into the combustion chamber 3.

On the other hand, the exhaust port of each cylinder is connected to an exhaust manifold 14. The exhaust manifold 14 includes a branch pipe 14a for each cylinder which forms an upstream portion of the exhaust manifold 14 and an exhaust aggregation section 14b forming a downstream portion of the exhaust manifold 14. An exhaust pipe 6 is connected to the downstream side of the exhaust aggregation section 14b. The exhaust port, the exhaust manifold 14, and the exhaust pipe 6 form an exhaust passage.

Furthermore, the exhaust passage located downstream of the exhaust aggregation section 14b of the exhaust manifolds 14 forms an exhaust passage common to the #1 to #4 cylinders that are the plurality of cylinders.

Catalysts each including a three-way catalyst, that is, an upstream catalyst 11 and a downstream catalyst 19, are arranged in series and attached to an upstream side and a downstream side, respectively, of the exhaust pipe 6. The catalysts 11 and 19 have an oxygen storage capacity (02 storage capability). That is, the catalysts 11 and 19 store excess air in exhaust gas to reduce NOx when the air-fuel ratio of exhaust gas is higher (leaner) than a stoichiometric ratio (theoretical air-fuel ratio, for example, A/F=14.6). Furthermore, the catalysts 11 and 19 emit stored oxygen to oxidize HC and CO in the exhaust gas when the air-fuel ratio of exhaust gas is lower (richer) than the stoichiometric ratio.

A first air-fuel ratio sensor and a second air-fuel ratio sensor, that is, a pre-catalyst sensor 17 and a post-catalyst sensor 18, are installed upstream and downstream, respectively, of the upstream catalyst 11 to detect the air-fuel ratio of exhaust gas. The pre-catalyst sensor 17 and the post-catalyst sensor 18 are installed immediately before and after the upstream catalyst, respectively, to detect the air-fuel ratio based on the concentration of oxygen in the exhaust. Thus, single pre-catalyst sensor 17 is installed at an exhaust junction on an upstream side of the upstream catalyst 11. The pre-catalyst sensor 17 corresponds to an "air-fuel ratio sensor" according to the present invention.

The ignition plug 7, the throttle valve 10, the injector 12, and the like are electrically connected to an electronic control unit (hereinafter referred to as an ECU) 20 serving as a control apparatus or a control unit. The ECU 20 includes a CPU, a ROM, a RAM, an I/O port, and a storage device, none of which is depicted in the drawings. Furthermore, the ECU 20 connects electrically to, besides the above-described airflow meter 5, pre-catalyst sensor 17, and post-catalyst sensor 18, a crank angle sensor 16 that detects the crank angle of the internal combustion engine 1, an accelerator opening sensor 15 that detects the opening of an accelerator, and various other sensors via A/D converters or the like (not depicted in the drawings). Based on detection values from the various sensors, the ECU 20 controls the ignition plug 7, the throttle valve 10, the injector 12, and the like to control an ignition period, the amount of injected fuel, a fuel injection period, a throttle opening, and the like so as to obtain desired outputs.

The throttle valve 10 includes a throttle opening sensor (not depicted in the drawings), which transmits a signal to the ECU 20. The ECU 20 feedback-controls the opening of the throttle valve 10 (throttle opening) so as to make the actual throttle opening equal to a target throttle opening dictated according to the accelerator opening.

Based on a signal from the air flow meter 5, the ECU 20 detects the amount of intake air, that is, an intake flow rate, which is the amount of air sucked per unit time. The ECU 20 detects a load on the engine 1 based on at least one of the followings: the detected throttle opening and the amount of intake air.

Based on a crank pulse signal from the crank angle sensor 16, the ECU 20 detects the crank angle itself and the number of rotations of the engine 1. The "number of rotations" as used herein refers to the number of rotations per unit time and is used synonymously with rotation speed. According to the present embodiment, the number of rotations refers to the number of rotations per minute rpm.

Figure 2:
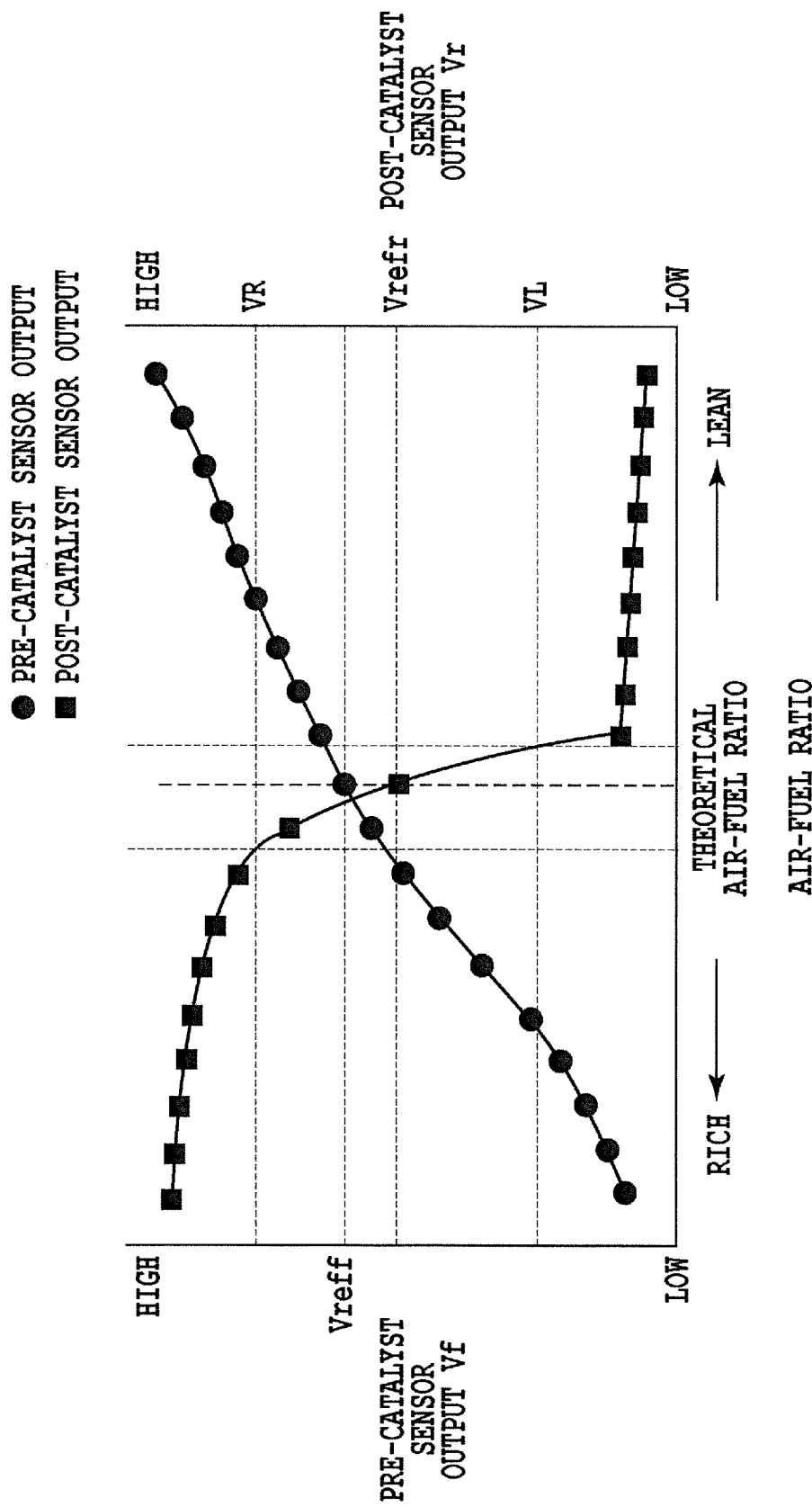
FIG. 2 is a graph depicting output characteristics of a pre-catalyst sensor and a post-catalyst sensor.

The pre-catalyst sensor 17 includes what is called a wide-range air-fuel ratio sensor and can consecutively detect a relatively wide range of air-fuel ratios. FIG. 2 depicts the output characteristic of the pre-catalyst sensor 17. As depicted in FIG. 2, the pre-catalyst sensor 17 outputs a voltage signal Vf of a magnitude proportional to an exhaust air-fuel ratio. An output voltage obtained when the exhaust air-fuel ratio is stoichiometric is Vreff (for example, 3.3 V).

On the other hand, the post-catalyst sensor 18 includes what is called an $O_2$ sensor or an oxygen sensor and has a Z characteristic that an output value from the post-catalyst sensor 18 changes rapidly beyond the stoichiometric ratio. FIG. 2 depicts the output characteristic of the post-catalyst sensor. As depicted in FIG. 2, an output voltage obtained when the exhaust air-fuel ratio is stoichiometric, that is, a stoichiometrically equivalent value is Vrefr (for example, 0.45 V). The output voltage of the post-catalyst sensor 21 varies within a predetermined range (for example, from 0 V to 1 V). When the exhaust air-fuel ratio is leaner than the stoichiometric ratio, the output voltage of the post-catalyst sensor is lower than the stoichiometrically equivalent value Vrefr. When the exhaust air-fuel ratio is richer than the stoichiometric ratio, the output voltage of the post-catalyst sensor is higher than the stoichiometrically equivalent value Vrefr.

The upstream catalyst 11 and the downstream catalyst 19 simultaneously remove NOx, HC, and CO, which are harmful components in the exhaust, when the air-fuel ratio of exhaust gas flowing into each of the catalysts is close to the stoichiometric ratio. The range (window) of the air-fuel ratio within which the three components can be efficiently removed for purification at the same time is relatively narrow.

Thus, during normal operation, the ECU 20 performs air-fuel ratio feedback control so as to control the air-fuel ratio of exhaust gas discharged from the combustion chamber 3 and fed to the upstream catalyst 11 to the neighborhood of the stoichiometric ratio. The air-fuel ratio feedback control includes main air-fuel ratio control (main air-fuel ratio feedback control) that controls the amount of fuel injected to make the exhaust air-fuel ratio detected by the pre-catalyst sensor 17 equal to the stoichiometric ratio, a predetermined target air-fuel ratio and auxiliary air-fuel ratio control (auxiliary air-fuel ratio feedback control) that controls the amount of fuel injected to make the exhaust air-fuel ratio detected by the post-catalyst sensor 18 equal to the stoichiometric ratio.

The air-fuel ratio feedback control using the stoichiometric ratio as the target air-fuel ratio is referred to as stoichiometric control. The stoichiometric ratio corresponds to a reference air-fuel ratio. The stoichiometric uniformly corrects the amount of fuel injected for all the cylinders by the same value.

For example, some of all the cylinders, particularly one cylinder, may become abnormal to cause a variation (imbalance) in the air-fuel ratio among the cylinders. For example, the injector 12 for the #1 cylinder may fail, and a larger amount of fuel may be injected in the #1 cylinder than by the remaining cylinders, the #2, #3, and #4 cylinders. Thus, the air-fuel ratio in the #1 cylinder may deviate significantly toward a rich side compared to the air-fuel ratios in the #2, #3, and #4 cylinders. Even in this case, the air-fuel ratio of total gas supplied to the pre-catalyst sensor 17, that is, the mean value of the air-fuel ratios in the cylinders, may be controlled to the stoichiometric ratio by performing the above-described stoichiometric control to apply a relatively large amount of correction. However, the air-fuel ratios of the individual cylinders are such that the air-fuel ratio in the #1 cylinder is much richer than the stoichiometric ratio, whereas and the air-fuel ratio in the #2, #3, and #4 cylinders are slightly leaner than the stoichiometric ratio. Thus, the air-fuel ratios are only totally in balance; only the total air-fuel ratio is stoichiometric. This is obviously not preferable for emission control. Thus, the present embodiment includes an apparatus that detects such an inter-cylinder air-fuel ratio variation abnormality.

An aspect of variation abnormality detection according to the present embodiment will be described below.

Figure 3:
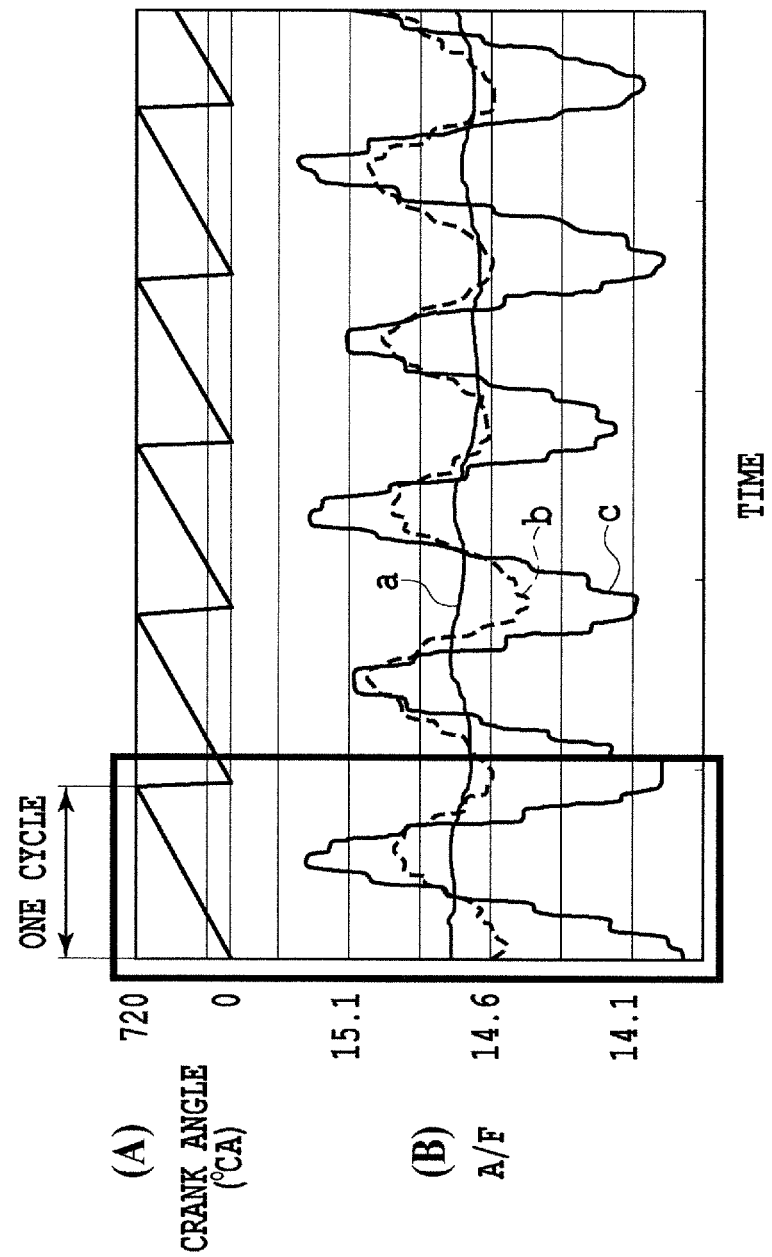
FIG. 3 is a graph depicting a fluctuation in exhaust air-fuel ratio in accordance with the degree of an inter-cylinder variation in air-fuel ratio.

As depicted in FIG. 3, a variation in the air-fuel ratio among the cylinders increases a fluctuation in the exhaust air-fuel ratio. Air-fuel ratio lines a, b, c in (B) indicate air-fuel ratios detected by the pre-catalyst sensor 17 when no variation in air-fuel ratio occurs, when only one cylinder has a rich-side deviation at an imbalance rate of 20%, and when only one cylinder has a rich-side deviation at an imbalance rate of 50%, respectively. As seen in the air-fuel ratio lines, the amplitude of the variation in air-fuel ratio increases consistently with the degree of the variation among the cylinders.

The imbalance rate as used herein is a parameter correlated with the degree of the variation in air-fuel ratio among the cylinders. That is, the imbalance rate is a value representing the rate at which, if only one of all the cylinders has an air-fuel ratio deviating from the air-fuel ratio in the remaining cylinders, the air-fuel ratio in the cylinder with the air-fuel ratio deviation (imbalance cylinder) deviates from the air-fuel ratio in the cylinders with no air-fuel ratio deviation (balance cylinder). When the imbalance rate is denoted by IB, the amount of fuel injected in the imbalance cylinder is denoted by Qib, and the amount of fuel injected in the balance cylinder, that is, the reference injection amount, is denoted by Qs, IB=(Qib−Qs)/Qs. A higher imbalance rate IB leads to an increase in the deviation of the amount of fuel injected in the imbalance cylinder with respect to the amount of fuel injected in the balance cylinder, and in the degree of variation in air-fuel ratio. According to the present embodiment, the reference injection amount Qs is equal to the stoichiometrically equivalent amount of fuel injected.

As seen in FIG. 3, a fluctuation in the output from the pre-catalyst sensor 17 increases consistently with the imbalance rate, that is, the degree of variation in inter-cylinder air-fuel ratio.

Hence, utilizing this characteristic, the present embodiment uses an output fluctuation parameter X that is a parameter correlated with the degree of fluctuation in the output from the pre-catalyst sensor 17, as a parameter correlated with the degree of inter-cylinder air-fuel ratio variation, and calculates (or detects) the output fluctuation parameter X. Then, based on the calculated output fluctuation parameter X, variation abnormality is detected. The above-described imbalance rate is used only for description.

Figure 4:
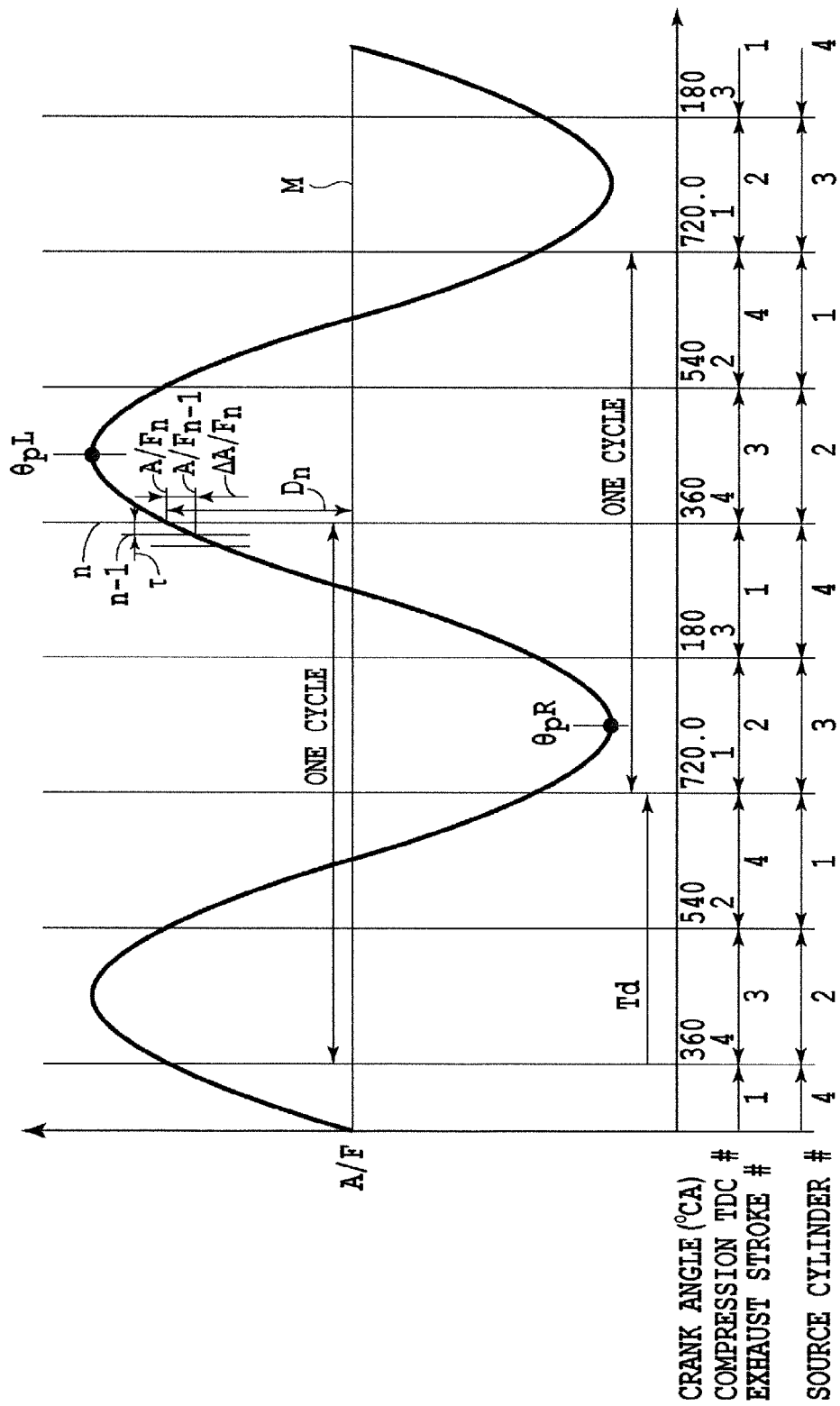
FIG. 4 is a graph depicting a transition of output from the pre-catalyst sensor with respect to a crank angle.

A method for calculating the output fluctuation parameter X will be described below. FIG. 4 depicts a transition of the pre-catalyst sensor output with respect to a crank angle. The crank angle is also referred to as a crank phase or simply a phase. The pre-catalyst sensor output may be the value of the air-fuel ratio A/F into which an output voltage Vf from the pre-catalyst sensor 17 is converted. However, the output voltage Vf from the pre-catalyst sensor 17 may be used directly as the pre-catalyst sensor output.

As depicted in FIG. 4, the pre-catalyst sensor output A/F varies at a period equal to one cycle of the engine (=720° CA; also referred to as one engine cycle). That is, an output waveform from the pre-catalyst sensor 17 is a periodic waveform with a period equal to one cycle of the engine.

As depicted in FIG. 4, the ECU 20 acquires the pre-catalyst sensor output A/F at each predetermined sample period τ during one engine cycle. The ECU 20 then determines the absolute value of the difference between a value $A/F_n$ acquired at the current (n) timing and a value $A/F_{n-1}$ acquired at the preceding (n−1) timing (the absolute value is hereinafter referred to as an output difference) in accordance with Formula (1). The output difference $\Delta A/F_n$ can be replaced with a differential value or the absolute value of an inclination obtained at the current timing.

[Formula 1]

$$\Delta A/F_n = |A/F_n - A/F_{n-1}| \qquad (1)$$

Most simply stated, the output difference $\Delta A/F_n$ represents the magnitude of the fluctuation in the pre-catalyst sensor output. This is because the inclination of an air-fuel ratio diagram and thus the output difference $\Delta A/F_n$ increase consistently with the degree of the fluctuation. Consequently, the value of the output difference $\Delta A/F_n$ at a predetermined timing can be used as the output fluctuation parameter.

However, for improved accuracy, the present embodiment uses the mean value of a plurality of output differences $\Delta A/F_n$ as the output fluctuation parameter. The present embodiment determines the output fluctuation parameter X by integrating the output difference $\Delta A/F_n$ at every sample period τ during M engine cycles (M denotes an integer of 2 or more, for example, M=100) and dividing the final integrated value by the number of samples. The output fluctuation parameter X increases consistently with the degree of the fluctuation in pre-catalyst sensor output.

Any value correlated with the degree of the fluctuation in pre-catalyst sensor output can be used as the output fluctuation parameter. For example, the output fluctuation parameter may be calculated based on the difference between the lean-side (maximum) peak and rich-side (minimum) peak (what is called, a peak-to-peak value) of the pre-catalyst sensor output during one engine cycle or the absolute value of the maximum peak or minimum peak of a second-order differential value. This is because an increase in the degree of the fluctuation in pre-catalyst sensor output increases the difference between the lean-side peak and rich-side peak of the pre-catalyst sensor output and the absolute value of the maximum peak or minimum peak of the second-order differential value.

Figure 5:
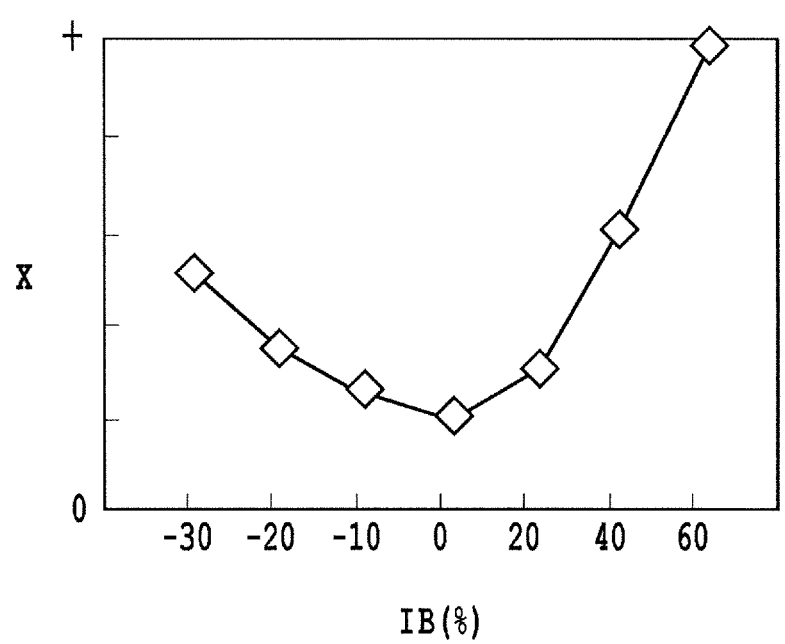
FIG. 5 is a graph depicting a relation between an imbalance rate and an output fluctuation parameter.

FIG. 5 depicts a relation between the imbalance rate IB (%) and the output fluctuation parameter X. As depicted in FIG. 5, the imbalance rate IB (%) and the output fluctuation parameter X have a strong correlation, and the output fluctuation parameter X tends to increase consistently with the absolute value of the imbalance rate IB.

Whether or not variation abnormality is present can be determined by comparing the calculated output fluctuation parameter X with a predetermined determination value α. For example, variation abnormality is determined to be present (abnormal) if the calculated output fluctuation parameter X is equal to or larger than the determination value α. Variation abnormality is determined to be absent (normal) if the calculated output fluctuation parameter X is smaller than the determination value α.

When variation abnormality is detected, it is desirable to also be able to determine an abnormal cylinder that may cause a deviation of air-fuel ratio and thus variation abnormality. This contributes to subsequent quick repairs.

On the other hand, when a method is adopted which involves identifying an abnormal cylinder based on the crank angle (also referred to as the peak phase) corresponding to the peak (lean-side peak and rich-side peak) of the output waveform from the pre-catalyst sensor as depicted in FIG. 4, a wrong cylinder may disadvantageously be identified as the abnormal cylinder.

Thus, to increase the accuracy with which the abnormal cylinder is identified, the present embodiment identifies the abnormal cylinder using another method not based on the peak phase. An abnormal-cylinder identification method according to the present embodiment will be described below. However, before the description of the abnormal-cylinder identification method according to the present embodiment, an abnormal-cylinder identification method in a comparative example based on the peak phase will be described for easy understanding.

As depicted in FIG. 4, the engine has one cycle from 0° CA to 720° CA. According to the present embodiment, at 0° CA, the #1 cylinder is at the compression top dead center (compression TDC). At 180° CA, the #3 cylinder is at the compression top dead center. At 360° CA, the #4 cylinder is at the compression top dead center. At 540° CA, the #2 cylinder is at the compression top dead center. In other words, ignition occurs in the cylinders in the following order: the #1 cylinder, the #3 cylinder, the #4 cylinder, and the #2 cylinder.

In this case, a stroke between 0° CA and 180° CA corresponds to an exhaust stroke of the #2 cylinder. A stroke between 180° CA and 360° CA corresponds to an exhaust stroke of the #1 cylinder. A stroke between 360° CA and 540° CA corresponds to an exhaust stroke of the #3 cylinder. A stroke between 540° CA and 720° CA corresponds to an exhaust stroke of the #4 cylinder.

Time delay caused by transportation delay, response delay, or the like may occur before exhaust gas discharged from the combustion chamber 3 is actually detected by the pre-catalyst sensor 17. This delay time is denoted as Td. In the illustrated example, Td=360° CA for convenience. However, the length of the delay time Td varies according to the engine individual, the operational status of the engine, or the like.

For Td=360° CA, a source cylinder for exhaust gas detected by the pre-catalyst sensor 17 at each crank angle is as depicted in FIG. 4. For example, during a crank angle period between 0° and 180°, the source cylinder is #3, and exhaust gas discharged from the #3 cylinder is detected by the pre-catalyst sensor 17.

As indicated by the output waveform from the pre-catalyst sensor in the illustrated example, the source cylinder is #2 at the lean-side peak phase θpL and is #3 at the rich-side peak phase θpR. Thus, the method in the comparative example based on the peak phases identifies the #2 and #3 cylinders as abnormal cylinders. In particular, the #2 cylinder is likely to have a lean-side deviation of the air-fuel ratio or the #3 cylinder is likely to have a rich-side deviation of the air-fuel ratio. Consequently, the #2 cylinder is identified as the abnormal cylinder with a lean-side deviation, and the #3 cylinder is identified as the abnormal cylinder with a rich-side deviation. As described above, the two cylinders are identified as abnormal cylinders in association with the two peaks of the output waveform from the sensor.

Figure 6:
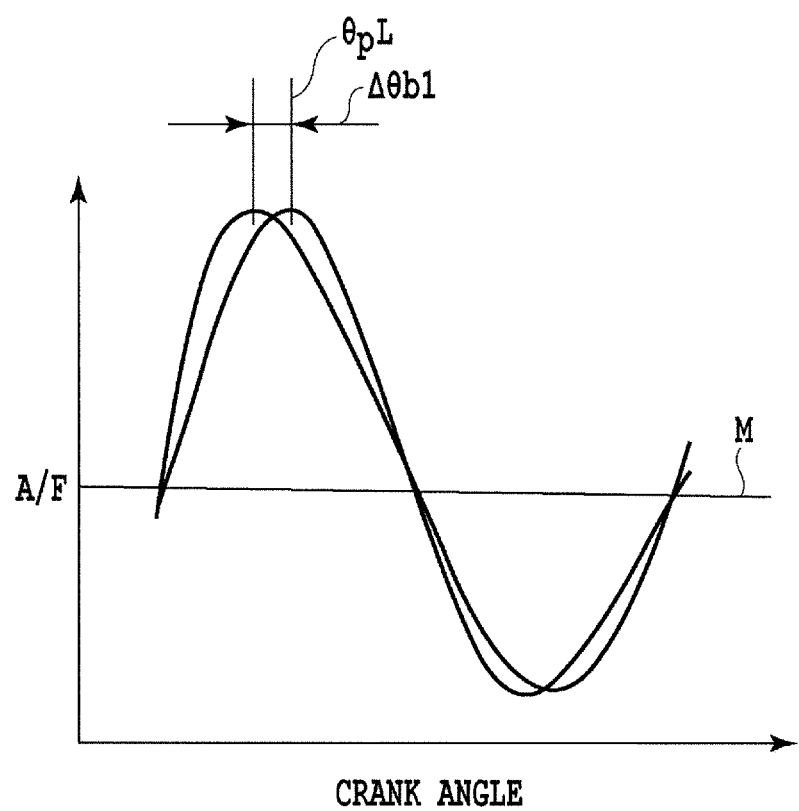
FIG. 6 is a graph depicting how a peak phase varies in a comparative example.

However, the method in the comparative example poses the following problems. In general, the peak phases θpL and θpR of the output waveform from the pre-catalyst sensor vary relatively significantly. Possible causes of the variation include a slight variation in load during operation of the engine and a variation among individual variable valve timing mechanisms. FIG. 6 depicts how the peak phase θpL varies. A variation range in the comparative example is denoted by Δθb1.

When the peak phase θpL or θpR varies, a wrong abnormal cylinder may correspondingly be identified. For example, it is assumed that the output waveform from the pre-catalyst sensor is different from the waveform in FIG. 4 and the rich-side peak phase θpR, located at a central position of the variation range, lies near the 180° CA (not depicted in the drawings). Then, when the rich-side peak phase θpR varies to smaller phases and becomes smaller than 180° CA, the #3 cylinder is identified as the abnormal cylinder. When the rich-side peak phase θpR varies to larger phases and becomes larger than 180° CA, the #4 cylinder is identified as the abnormal cylinder. Thus, when the abnormal cylinder is identified based on the peak phase, which is local information on the sensor output waveform, since the peak phase has a wide variation range, the variation may cause a wrong cylinder to be identified as the abnormal cylinder.

Thus, in the method according to the present embodiment, the identification of the abnormal cylinder is not based on the peak phase. Specifically, a division crank angle is calculated which bisects an area of at least one of regions which are present on a lean side and a rich side, respectively, with respect to the mean value of the output waveform from the pre-catalyst sensor during one engine cycle and which are enclosed by the output waveform from the pre-catalyst sensor and the mean value, and the abnormal cylinder is identified based on the division crank angle. Such identification is performed by the ECU 20.

Figure 7:
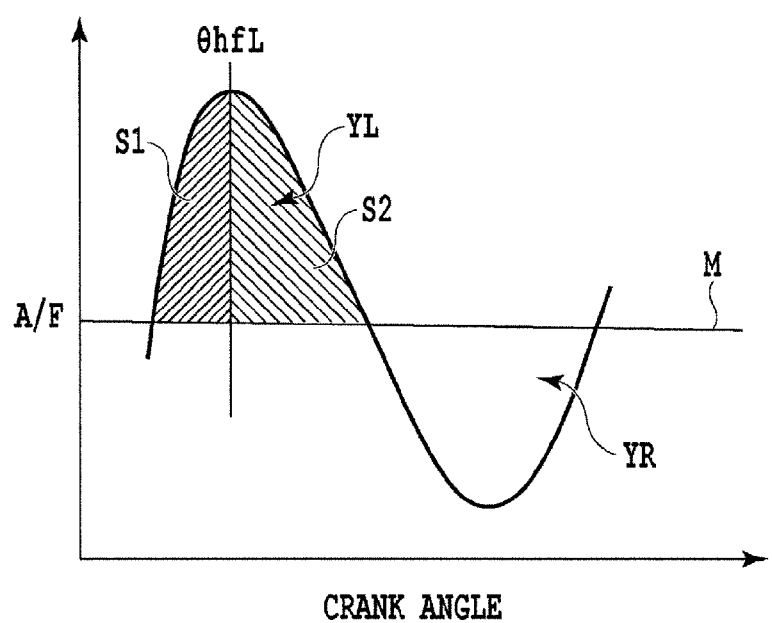
FIG. 7 is a graph illustrating an abnormal-cylinder identification method according to the present embodiment.

The method according to the present embodiment will be generally described based on FIG. 7. The method will be described herein in which two division crank angles each of which bisects the area of the corresponding one of the two regions are calculated to identify two abnormal cylinders. However, one division crank angle that bisects the area of one of the regions may be calculated to allow one abnormal cylinder to be identified.

In FIG. 7, M depicts the mean value of the output waveform from the pre-catalyst sensor. In the illustrated example, the mean value M slightly decreases with increasing crank angle. However, the present embodiment is not limited to this example, the mean value M may change in any manner or may remain unchanged and constant. In fact, the stoichiometric control is in execution, and thus, the mean value M takes a value close to the stoichiometric ratio.

With respect to the mean value M, two regions are present, a region located on the lean side, that is, a lean region YL, and a region located on the rich side, that is, a rich region YR. The lean region YL refers to a chevron region enclosed by the mean value M and a (upward protruding) portion of the output waveform present on the lean side with respect to the mean value M. The rich region YR refers to a trough-shaped region enclosed by the mean value M and a (downward protruding) portion of the output waveform present on the rich side with respect to the mean value M.

For example, for the lean region YL, a lean side division crank angle θhfL that is a crank angle that bisects the area of the lean region YL is calculated. The area of the lean region YL is the area of the region enclosed by the mean value M and the portion of the output waveform present on the lean side with respect to the mean value M. The area of the lean region YL is bisected into S1 and S2 at the position of the division crank angle θhfL. Although not depicted in the drawings, a rich side division crank angle θhfR is similarly calculated for the rich region YR.

Then, as is the case with the comparative example, the lean side peak phase θpL is replaced with lean side division crank angle θhfL, and a source cylinder at the point in time of the lean side division crank angle θhfL is determined to be an abnormal cylinder with a lean-side deviation. For example, when the lean side division crank angle θhfL is at the position of the lean side peak phase θpL in FIG. 4, the #2 cylinder is identified as the abnormal cylinder with a lean-side deviation.

Similarly, for the rich side, a source cylinder at the point in time of the rich side division crank angle θhfR is identified as the abnormal cylinder with a rich-side deviation. For example, when the rich side division crank angle θhfR is at the position of the rich side peak phase θpR in FIG. 4, the #3 cylinder is identified as the abnormal cylinder with a rich-side deviation.

Figure 8:
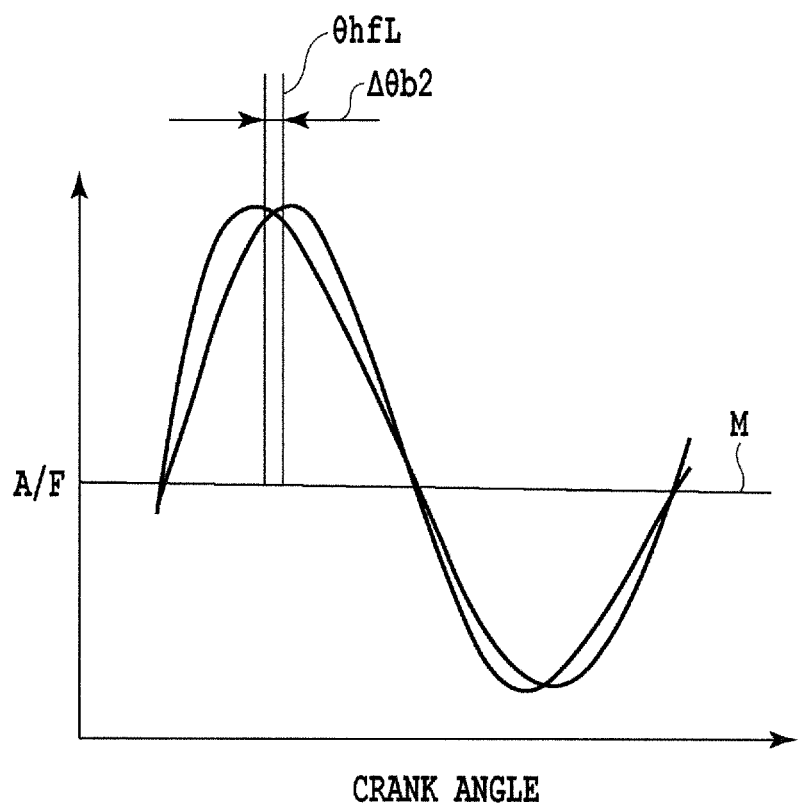
FIG. 8 is a graph depicting how a division crank angle varies according to the present embodiment.

The use of such division crank angles θhfL and θhfR advantageously enables an increase in the accuracy with which the abnormal cylinder is identified because a variation in division crank angles θhfL and θhfR is smaller than a variation in peak phases θpL and θpR. FIG. 8 depicts how the division crank angle θhfL varies. A variation Δθb2 in division crank angle θhfL is smaller than a variation range Δθb1 in the comparative example depicted in FIG. 6.

The variation in division crank angles θhfL and θhfR is smaller than the variation in peak phases θpL and θpR because, even when the peak phase of the sensor output waveform is shifted, the division crank angle that bisects the area of the region is difficult to shift. Unless the sensor output waveform is translated in the direction of the crank angle, a change in the phase of the division crank angle is smaller than a change in peak phase. Thus, robustness to the variation can be enhanced. The results of the inventors' tests indicate that the present embodiment enables the variation range of 25° CA in the comparative example to be reduced to 14° CA.

Now, the variation abnormality detection process according to the present embodiment will be described. The detection process is executed by the ECU 20 in accordance with such an algorithm as illustrated in a flowchart in FIG. 9.

First, in step S101, the ECU 20 determines whether a predetermined prerequisite suitable for execution of variation abnormality detection is established. For example, the prerequisite is established when the following conditions are established.

(1) Warm-up of the engine is complete.
(2) The pre-catalyst sensor 17 and the post-catalyst sensor 18 have been activated.
(3) The upstream catalyst 11 and the downstream catalyst have been activated.
(4) The number of rotations Ne of the engine and a load KL on the engine fall within the respective predetermined ranges.

For example, the number of rotations Ne is between 1,200 (rpm) and 2,000 (rpm), and the load KL is between 40(%) and 60(%).

(5) The stoichiometric control is in execution.

Another example of the prerequisite may be specified. For example, the condition that (6) the engine is operating steadily may be added.

If the prerequisite is not established, the ECU 20 waits. When the prerequisite is established, the ECU 20 proceeds to step S202. In this case, steps subsequent to step S102 are assumed to be executed only when the prerequisite is established.

In steps S102 to S104, a process of calculating the output fluctuation parameter X is executed. First, in step S102, the above-described ΔA/Fn is sequentially calculated and integrated at every predetermined sample period τ (for example, 10° CA). In step S103, whether or not M engine cycles have elapsed is determined. If M engine cycles have not elapsed, the ECU 20 returns to step S102. If M engine cycles have elapsed, the value of the output fluctuation parameter X is calculated in step S104. In this regard, the integral value of the output difference ΔA/F$_n$ integrated for the M engine cycles is divided by the number of samples to determine the value of the output fluctuation parameter X.

Then, in step S105, the value of the output fluctuation parameter X is compared with a predetermined determination value α. When X<α, the ECU 20 proceeds to step S108 to determine that no variation abnormality is occurring, and ends the detection process. On the other hand, when X≥α, the ECU 20 proceeds to step S106 to determine that a variation abnormality is occurring, and proceeds to next step S107.

In step S107, the abnormal cylinder with a deviation of the air-fuel ratio is identified. The identification is executed by a particular process described below. Information on the identified abnormal cylinder is saved to a writable memory (RAM or the like) of the ECU 20. Thus, the detection process is ended.

Figure 9:
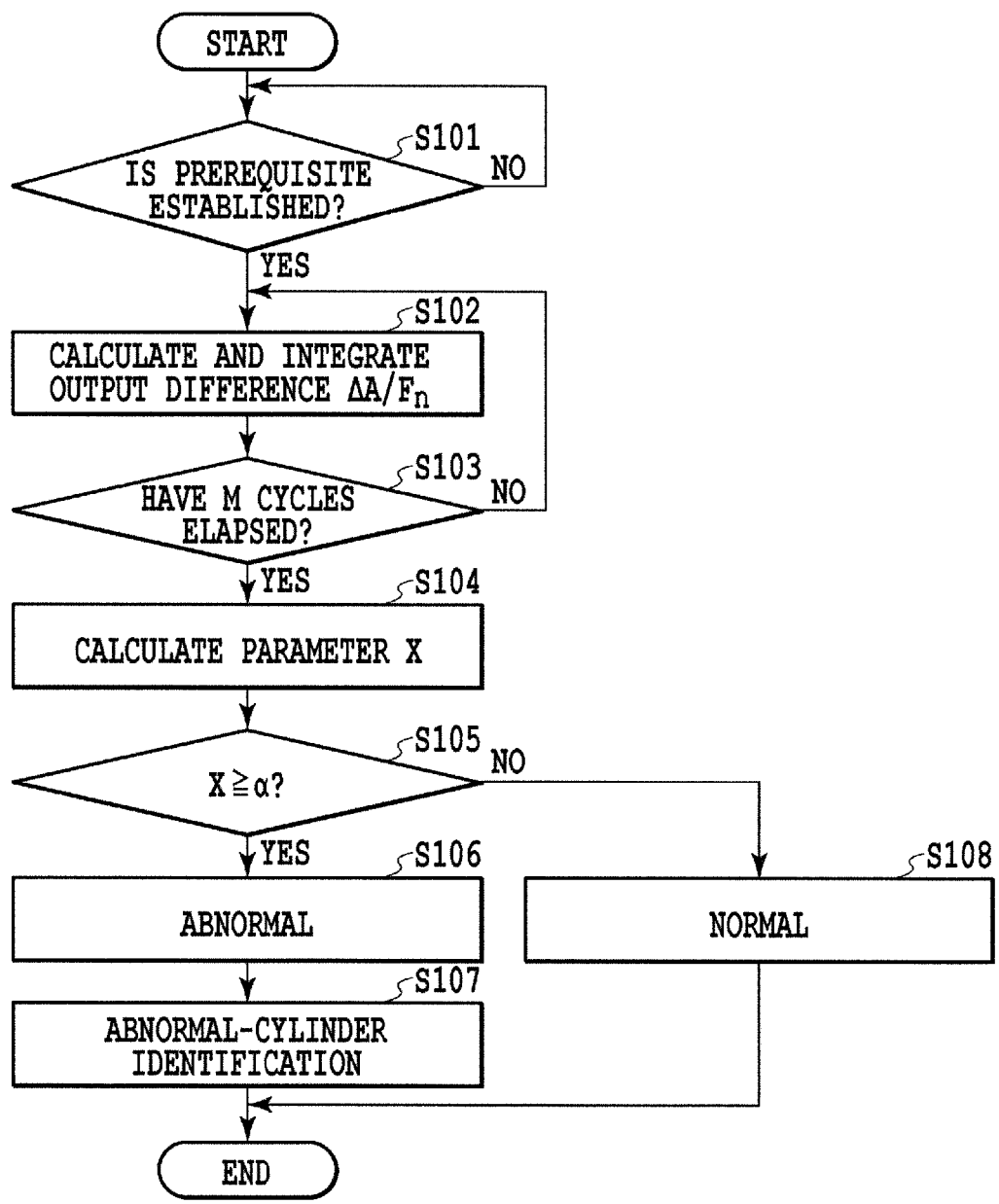
FIG. 9 is a flowchart of a variation abnormality detection process.
Figures 10, 10A:
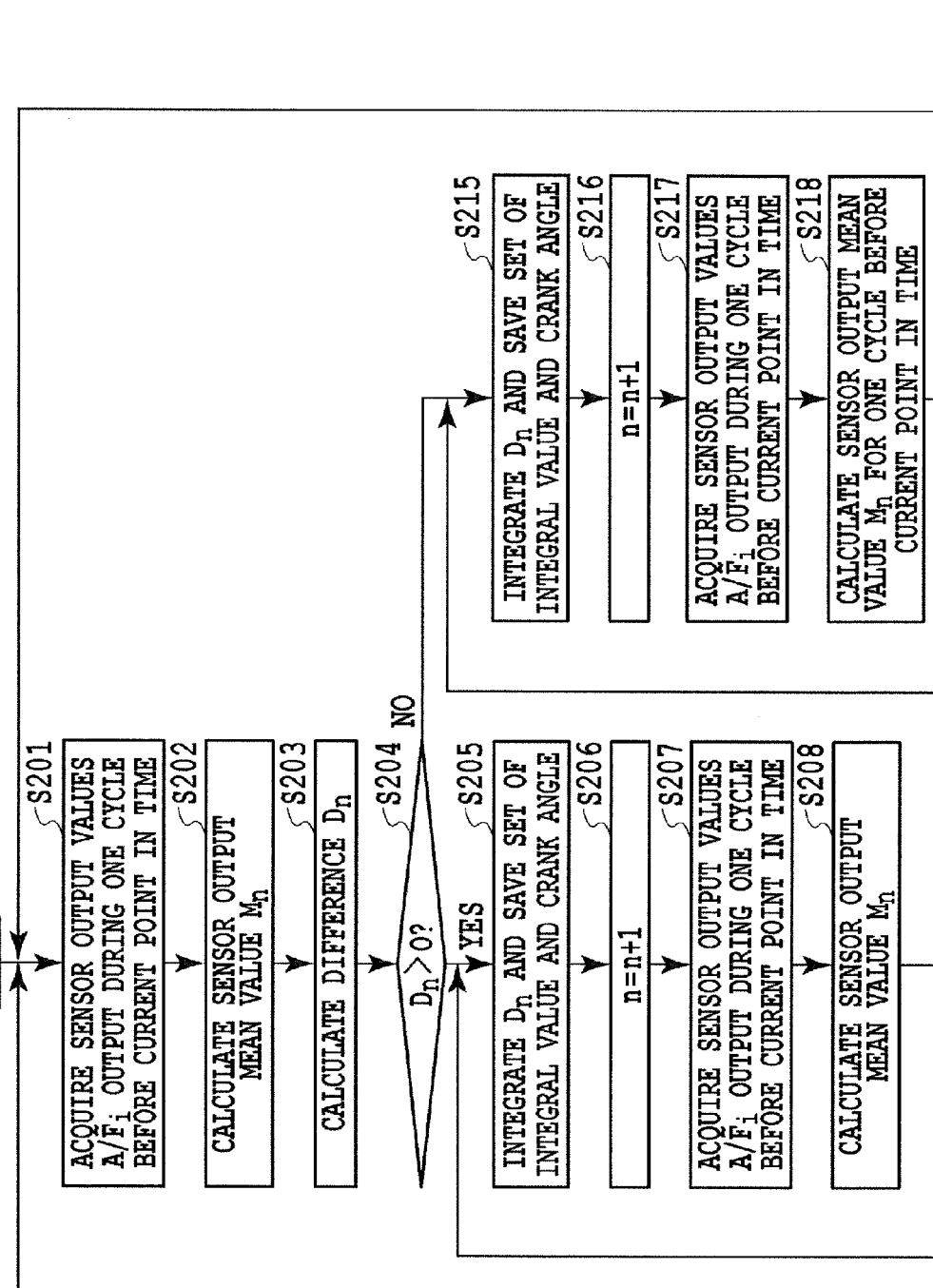
FIG. 10 is a diagram showing a relationship between FIGS. 10A and 10B.
FIG. 10A shows a portion of a flowchart of an abnormal-cylinder identification process.
Figure 10B:
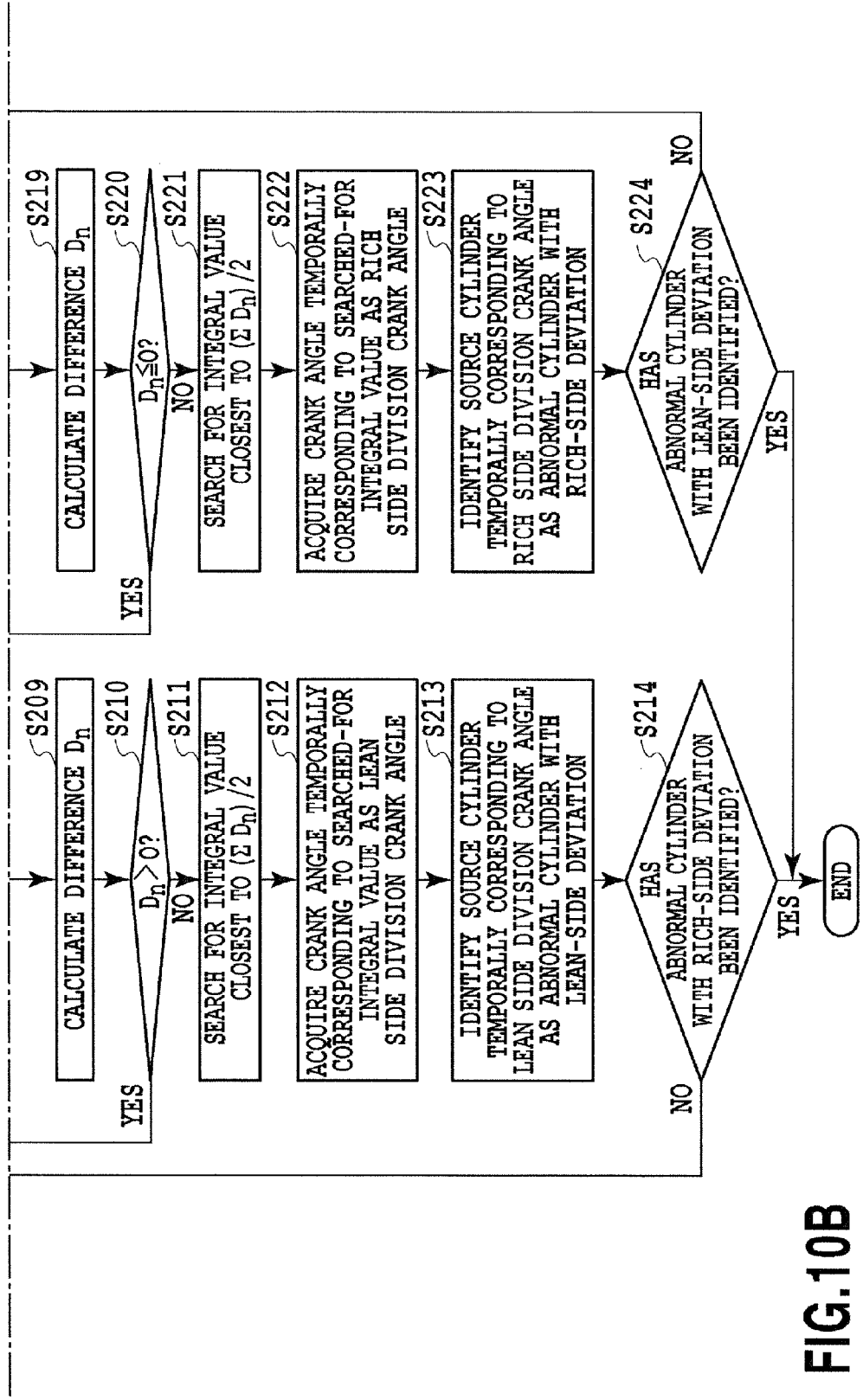
FIG. 10B shows a portion of the flowchart of the abnormal-cylinder identification process.

Now, the abnormal-cylinder identification process according to the present embodiment will be described. The identification process is also executed by the ECU 20 in accordance with such an algorithm as illustrated in a flowchart in FIGS. 10A and 10B. The identification process is preferably executed only when such a prerequisite as described for step S101 in FIG. 9 is established. The following description will be given also with appropriate reference to FIG. 4 for easy understanding.

First, in step S201, output values (sensor output values) A/F$_i$ output by the pre-catalyst sensor 17 until one engine cycle (=720° CA) before the current calculation period are acquired (i=n, n−1, n−2, ...). The sensor output value A/F$_n$ during the current calculation period is the output value itself obtained from the pre-catalyst sensor 17 at the current point in time. Past sensor output values A/F$_{n-1}$, A/F$_{n-2}$, ... before the current calculation period are pre-saved in a buffer of the ECU 20.

According to the present embodiment, the sample period τ is 10° CA, and the ECU 20 performs a calculation at every 10° CA. Hence, one engine cycle includes 72 samples or data (720/10=72).

Then, in step S202, the mean value of the sensor output values A/F$_i$ output during one engine cycle before the current calculation period is calculated, that is, a sensor output mean value M$_n$ at the current calculation period is calculated. The sensor output mean value M$_n$ is expressed by Formula (2) and can be paraphrased as a moving average value of the sensor output value A/Fi at the current point in time. m denotes the number of samples.

[Formula 2]

$$M_n = \frac{\sum A/F_i}{m} \qquad (2)$$

FIG. 4 depicts a sensor output mean value M. In the illustrated example, the sensor output mean value M is constant. However, the sensor output mean value may change as the crank angle proceeds. During stoichiometric control, the sensor output mean value M is close to the stoichiometric ratio.

Then, in step S203, a difference D$_n$ between the sensor output value A/Fn and the sensor output mean value Mn is calculated. The difference D$_n$ is expressed by:

[Formula 3]

$$D_n = A/F_n - M_n \qquad (3)$$

In step S204, whether or not the difference D$_n$ at the current calculation period is larger than zero is determined, that is, whether or not the difference D$_n$ corresponds to the difference for the lean region is determined.

When the result of the determination is Yes, the ECU 20 proceeds to step S205 to integrate the difference $D_n$ at the current calculation period. Furthermore, the crank angle at the current calculation period is acquired from the crank angle sensor 16. A set of the integral value of the difference $D_n$ and the crank angle is saved to the ECU 20 as set data. Thus, a step of calculating the area of the lean region is executed.

The illustrated identification process starts when the sign of the difference $D_n$ changes. This is because the integration needs to start at a start point in the lean region or the rich region.

Then, in step 206, n=n+1 is set, that is, the process is shifted to a calculation period of one sample period later.

In steps S207 to S209, calculations similar to the calculations in steps S201 to S203 are performed. That is, in step S207, sensor output values $A/F_i$ output during one engine cycle before the calculation period of one sample period later are acquired (i=n+1, n, n−1, . . . ). In step 208, the sensor output mean value Mn (=$M_{n+1}$) at the calculation period of one sample period later is calculated. Then, in step 209, the difference Dn (=$D_{n+1}$) at the calculation period of one sample period later is calculated.

Then, in step S210, whether or not the difference $D_n$ at the calculation period of one sample period later is larger than zero is determined.

If the determination results in Yes, the ECU 20 expects that the calculation of the area of the lean region is still being continued, and returns to step S205, where steps S205 to S209 are repeatedly executed. Thus, in step S210, the integration of the difference $D_n$ is repeatedly performed until the determination results in No in step 210, that is, until the difference $D_n$ becomes zero or smaller.

If the determination results in No in step 210, the ECU 20 expects that the calculation of the area of the lean region has ended, and proceeds to step S211.

In step S211, a final integral value $\Sigma D_n$ of the difference Dn is divided by 2 to obtain a value $(\Sigma D_n)/2$. Then, a plurality of set data repeatedly saved in step S205 is searched for the integral value of the difference $D_n$ that is closest to the value $(\Sigma D_n)/2$.

Then, in step S212, the crank angle temporally corresponding to the searched-for integral value of the difference $D_n$ is acquired. In other words, the crank angle is acquired which is included in the set data including the searched-for integral value of the difference $D_n$ and which belongs to a set including the integral value of the difference $D_n$. The crank angle acquired corresponds to the lean side division crank angle θhfL that bisects the area of the lean region.

Since the calculation is periodically performed, it is difficult to determine the crank angle that divides the area of the region completely into two completely equal parts. Hence, the "division crank angle that bisects the area of the region" means a crank angle that divides the area of the region into two approximately equal parts or two parts that are as equal as possible.

Then, in step S213, the source cylinder temporally corresponding to the lean side division crank angle θhfL is identified as the abnormal cylinder with a lean-side deviation.

Specifically, the ECU 20 constantly calculates such a relation between the crank angle and the source cylinder as depicted in FIG. 4, that is, determines from which of the cylinders exhaust gas detected by the pre-catalyst sensor 17 at a certain crank angle originates. In this regard, the delay time Td may be calculated based on an engine operating status (for example, the number of rotations and the load). Then, the source cylinder temporally corresponding to a certain crank angle may be determined based on the delay time Td. For example, a cylinder in an exhaust stroke the delay time Td before the current point in time may be determined to be a source cylinder. Alternatively, four crank angle sections during one engine cycle corresponding to the respective four source cylinders may be set for each engine cycle based on the engine operating status. A crank angle section of 0° CA to 180° CA corresponding to the #3 source cylinder, for example, as depicted in FIG. 4 is one of such four crank angle sections. In this case, the source cylinder can be determined depending on to which of the crank angle sections the point in time of a certain crank angle belongs.

In step S213, the source cylinder temporally corresponding to the lean side division crank angle θhfL is determined using such a relation between the crank angle and the source cylinder. The determined source cylinder is identified as the abnormal cylinder with a lean-side deviation of the air-fuel ratio.

Then, the ECU 20 proceeds to step S214 to determine whether or not the abnormal cylinder with a rich-side deviation of the air-fuel ratio has been identified. If the determination results in Yes, the ECU 20 ends the identification process. If the determination results in No, the ECU 20 returns to step S201 to further identify the abnormal cylinder with a rich-side deviation.

For the identification of the abnormal cylinder with a rich-side deviation, a process is executed which is similar to the process for identifying the abnormal cylinder with a lean-side deviation. This process will be generally described below.

After execution of steps S201 to S203, when, in step S204, the difference $D_n$ at the current calculation period is equal to or smaller than zero, that is, the difference $D_n$ at the current calculation period corresponds to the difference in the rich region, then the ECU 20 proceeds to step S215. In step S215, the difference $D_n$ at the current period is integrated, and a set of the integral value of the difference $D_n$ and the crank angle at the current calculation period is saved to the ECU 20 as set data. Thus, a step of calculating the area of the rich region is executed. Unlike on the lean side, on the rich side, the difference $D_n$ and the integral value of the difference $D_n$ have negative values. This poses no computational problem.

Then, in step S216, n=n+1 is set to shift the to a calculation period of one sample period later. In step S217, sensor output values $A/F_i$ output at one engine cycle before the calculation period of one sample period later are acquired (i=n+1, n, n−1, . . . ). In step 218, the sensor output mean value $M_n$ (=$M_{n+1}$) at the calculation period of one sample period later is calculated. Then, in step 219, the difference $D_n$ (=$D_{n+1}$) at the calculation period of one sample period later is calculated.

Then, in step 220, whether or not the difference $D_n$ at the calculation period of one sample period later is larger than zero is determined.

If the determination results in Yes, the ECU 20 expects that the calculation of the area of the rich region is still being continued, and returns to step S215, where steps S215 to S219 are repeatedly executed. Thus, the integration of the difference $D_n$ is repeatedly performed until the determination results in No in step 220, that is, until the difference $D_n$ becomes zero or smaller.

If the determination results in No in step 220, the ECU 20 expects that the calculation of the area of the rich region has ended, and proceeds to step S221.

In step S221, a plurality of set data repeatedly saved in step S215 is searched for the integral value of the difference $D_n$ that is closest to the value $(\Sigma D_n)/2$ resulting from the division of the final integral value $\Sigma D_n$ of the difference $D_n$ by 2.

Then, in step S222, the crank angle temporally corresponding to the searched-for integral value of the difference $D_n$ is acquired as the rich side division crank angle $\theta$hfR that bisects the area of the rich region.

Then, in step S223, the source cylinder temporally corresponding to the rich side division crank angle $\theta$hfR is identified as the abnormal cylinder with a rich-side deviation. An identification method in this case is similar to the identification method in step S213.

Finally, in step S224, whether or not the abnormal cylinder with a lean-side deviation has been identified is determined. If the abnormal cylinder with a rich-side deviation is identified first, the abnormal cylinder with a rich-side deviation has not been identified yet. Thus, the determination in step S224 results in No, and the ECU 20 returns to step S201 to continue the identification process in order to identify the abnormal cylinder with a lean-side deviation. If the determination in step S224 results in Yes, the identification process is immediately ended.

As described above, the identification process according to the present embodiment identifies two abnormal cylinders, an abnormal cylinder with a lean-side deviation and an abnormal cylinder with a rich-side deviation. This is because such a sensor output waveform as depicted in FIG. 4 includes two peaks present on the lean side and the rich side, respectively, so that an abnormal cylinder with a lean-side deviation or an abnormal cylinder with a rich-side deviation is expected to be actually present which correspond to either of the two peaks. However, further determining which of the abnormal cylinders is present is relatively difficult and needs an additional identification process, complicating the identification. Thus, the present embodiment identifies only the two abnormal cylinders. However, it is expected that a total of eight types of abnormalities may occur because each of the four cylinders may suffer two types of deviations, a lean-side deviation and a rich-side deviation. Consequently, being able to narrow down these abnormalities to two types is very effective.

On the other hand, alternatively, one of the lean and rich regions may be used to identify the abnormal cylinder with a lean-side density or the abnormal cylinder with a rich-side density. In this case, the cylinder not identified as the abnormal cylinder is no longer treated as an abnormal cylinder (or no longer selected as a candidate for the abnormal cylinder). In that context, identification accuracy is slightly degraded. However, this alternative method still allows one abnormal cylinder to be identified and is thus effective if the method is accepted. More importantly, the method uses the division crank angle to identify the abnormal cylinder and is thus very advantageous in terms of identification accuracy.

The "abnormal cylinder" refers to a cylinder with the air-fuel ratio thereof deviating from a reference value (in the present embodiment, the stoichiometric ratio) for the air-fuel ratio due to a certain failure or abnormality. Abnormal cylinders include cylinders with a high-level deviation of the air-fuel ratio which can be immediately determined to be abnormal and cylinders with a medium-level deviation (the medium level corresponds to what is called gray zone) of the air-fuel ratio which fails to be immediately determined to be abnormal or normal. The present embodiment first determines that variation abnormality is present (step S106 in FIG. 9) and then identifies the abnormal cylinder (step S107 in FIG. 9). Thus, the identified abnormal cylinder is determinately identified as an abnormal cylinder with a high- or medium-level deviation of the air-fuel ratio. In contrast, primary determination may be performed to check whether the cylinder is definitely normal or abnormal, and if the primary determination fails to determine whether the cylinder is normal or abnormal, secondary determination with an increased determination accuracy may be performed. In this case, a cylinder determined to be the abnormal cylinder in the primary determination may be determined in the secondary determination to be normal rather than being abnormal. However, the cylinder is abnormal even in this case.

The preferred embodiment of the present invention has been described in detail. However, various other embodiments of the present invention are possible. For example, the above-described numerical values are illustrative and may be variously changed. Furthermore, some parts of the above description relate only to one of the rich and lean sides. However, it should be easily understood by those skilled in the art that the description relating to one side is applicable to the other side.

The number of cylinders in the engine to which the present invention is applied is optional. Furthermore, a V8 engine may be configured by applying the configuration of the inline-four engine according to the present embodiment to each bank. In this case, the above-described detection process and identification process can be individually applied to each bank.

Instead of the mean value M of the output waveform from the air-fuel ratio sensor during one engine cycle, a predetermined constant value or fixed value may be used. That is, in the above-described embodiment, since the stoichiometric control is in execution, the lean region YL and the rich region YR are defined based on the mean value M close to the stoichiometric ratio. This is because the output waveform from the air-fuel ratio sensor is substantially centered around the stoichiometric ratio as described above. However, the present invention is not limited to this, the lean region YL and the rich region YR may be defined based on a preset constant value. In this case, the constant value is preferably equal to the stoichiometric ratio particularly when the stoichiometric control is in execution. In fact, if a target air-fuel ratio for air-fuel ratio feedback control is a predetermined value other than the stoichiometric ratio, the output waveform from the pre-catalyst sensor varies substantially around the predetermined value, and thus, the constant value may be equal to the predetermined value. In this case, the mean value M is also close to the predetermined value.

The embodiment of the present invention is not limited to the above-described embodiment, and the present invention includes any variations, applications, and equivalents embraced by the concepts of the present invention defined by the claims. Thus, the present invention should not be interpreted in a limited manner but is applicable to any other technique belonging to the scope of the concepts of the present invention.

What is claimed is:

1. An inter-cylinder air-fuel ratio variation abnormality detection apparatus including:
   an air-fuel ratio sensor installed in an exhaust passage common to a plurality of cylinders in a multicylinder internal combustion engine; and
   a control apparatus configured to calculate a parameter correlated with a degree of variation in output from the air-fuel ratio sensor and to detect an inter-cylinder air-fuel ratio variation abnormality based on the calculated parameter,
   wherein the control apparatus is configured to calculate a division crank angle that bisects an area of a region present in at least one of a rich and a lean sides with respect to a mean value of an output waveform from the air-fuel ratio sensor during one cycle of the internal combustion engine or such a predetermined constant value as corresponds to a center of fluctuation in the output waveform, the region being enclosed by an output waveform from the air-fuel ratio sensor and the mean value or the constant value, and to identify an abnormal cylinder with a deviation of the air-fuel ratio based on the division crank angle.

2. The inter-cylinder air-fuel ratio variation abnormality detection apparatus according to claim 1, wherein the control apparatus identifies, as the abnormal cylinder, a source cylinder for exhaust gas detected by the air-fuel ratio sensor at a point in time of the division crank angle.

3. The inter-cylinder air-fuel ratio variation abnormality detection apparatus according to claim 1, wherein the control apparatus calculates the division crank angle that bisects the area of the region present on the lean side with respect to the mean value or the constant value, and determines a source cylinder for exhaust gas detected by the air-fuel ratio sensor at a point in time of the division crank angle to identify the source cylinder as an abnormal cylinder with a lean-side deviation of the air-fuel ratio.

4. The inter-cylinder air-fuel ratio variation abnormality detection apparatus according to claim 1, wherein the control apparatus calculates the division crank angle that bisects the area of the region present on the rich side with respect to the mean value or the constant value, and determines a source cylinder for exhaust gas detected by the air-fuel ratio sensor at a point in time of the division crank angle to identify the source cylinder as an abnormal cylinder with a rich-side deviation of the air-fuel ratio.

5. The inter-cylinder air-fuel ratio variation abnormality detection apparatus according to claim 1, wherein the control apparatus is configured to calculate the division crank angle based on the mean value of the output waveform and to execute:

(A) a step of acquiring an output value from the air-fuel ratio sensor;

(B) a step of calculating the mean value based on the output value from the air-fuel ratio sensor;

(C) a step of calculating a difference between the output value from the air-fuel ratio sensor and the mean value;

(D) a step of integrating the difference while the output value from the air-fuel ratio sensor is present on one of the lean and rich sides with respect to the mean value, to calculate the area of the region; and (E) a step of calculating the division crank angle that bisects the area of the region.

6. The inter-cylinder air-fuel ratio variation abnormality detection apparatus according to claim 5, wherein the control apparatus is configured to further execute:

(F) a step of determine the source cylinder for exhaust gas detected by the air-fuel ratio sensor at the point in time of the division crank angle to identify the source cylinder as an abnormal cylinder.

7. The inter-cylinder air-fuel ratio variation abnormality detection apparatus according to claim 6, wherein the control apparatus, in the step (D), integrates the difference while the output value from the air-fuel ratio sensor is present on the lean side with respect to the mean value, and in the step (F), identifies the source cylinder as an abnormal cylinder with a lean-side deviation of the air-fuel ratio.

8. The inter-cylinder air-fuel ratio variation abnormality detection apparatus according to claim 6, wherein the control apparatus, in the step (D), integrates the difference while the output value from the air-fuel ratio sensor is present on the rich side with respect to the mean value, and in the step (F), identifies the source cylinder as an abnormal cylinder with a rich-side deviation of the air-fuel ratio.

9. The inter-cylinder air-fuel ratio variation abnormality detection apparatus according to claim 1, wherein the output waveform from the air-fuel ratio sensor is a periodic waveform with a period equal to one cycle of the internal combustion engine.

* * * * *